June 21, 1960

A. A. GRIFFITH 2,941,760

AIRCRAFT STRUCTURE

Filed Nov. 29, 1955

INVENTOR
Alan Arnold Griffith
BY
*Leech and Radner*
ATTORNEYS

June 21, 1960　　　A. A. GRIFFITH　　　2,941,760
AIRCRAFT STRUCTURE

Filed Nov. 29, 1955　　　　　　　　　　　　　　2 Sheets-Sheet 2

United States Patent Office 2,941,760
Patented June 21, 1960

2,941,760
AIRCRAFT STRUCTURE

Alan Arnold Griffith, Derby, England, assignor to Rolls-Royce Limited, Derby, England Filed Nov. 29, 1955, Ser. No. 549,600

Claims priority, application Great Britain Dec. 14, 1954

9 Claims. (Cl. 244—119)

This invention relates to aircraft structures and more particularly to those of aircraft designed to fly at supersonic speeds. With such aircraft it is well-known that the aircraft is subjected to the temperature rise attributable to the compression of the air by the speed of flight. At high flight speed, for example of the order of Mach Number 2, such temperature rise may be considerable and may result in thermal stresses being imposed in the aircraft structure. Thus for example the outer shell of the aircraft reaches the equilibrium temperature corresponding to the flight speed with rapidity, whilst internal structure, attached to the hot shell, may remain at a lower temperature, giving rise to severe thermal stresses between the shell and internal structure, particularly during acceleration or deceleration of the aircraft.

According to the present invention internal structural members of an aircraft designed for flight at supersonic speed are of hollow form and provision is made for passing heated air through them.

Preferably the heated air is abstracted from an air intake, for example an intake of a gas-turbine propulsion engine, or of a ramjet or other air consuming propulsion means such air being heated by compression due to flight speed. Alternatively one or more separate air intakes may be provided. Thermal insulation may be provided on the hollow structural members, to assist in these members attaining with rapidity the temperature of the air passing therethrough.

According to a feature of the invention means are provided for controlling the passage of heated air through the hollow internal structural members whereby such flow takes place at least whilst the speed of the aircraft is changing either in acceleration or deceleration. It will be appreciated that thermal stresses may arise not only during acceleration of the aircraft, when the outer shell or skin is becoming relatively hotter but also during deceleration when the shell will with rapidity assume the equilibrium temperature due to flight speed, whilst the internal structure may have assumed a temperature in excess of such equilibrium temperature.

According to yet another feature of the invention air exhausting from the hollow internal structure is ejected to atmosphere through rearwardly-directed discharge nozzles. Such nozzles may be adjustable to effect the control of the airflow, and may present when closed continuous surfaces conforming with the contour of the aircraft shell or skin. Thus when the aircraft is flying at a substantially constant speed, the control nozzles may be closed to avoid unnecessary drag.

The internal structural members of hollow form may be used in the aircraft structure to interconnect upper and lower surfaces of the shell or skin, providing shear members and/or suport members for propulsion or lift engines.

One preferred application of the invention is to aircraft as described in co-pending U.S.A. application No. 538,874 and such an embodiment is illustrated in the accompanying diagrammatic drawing in which.

Figure 1:
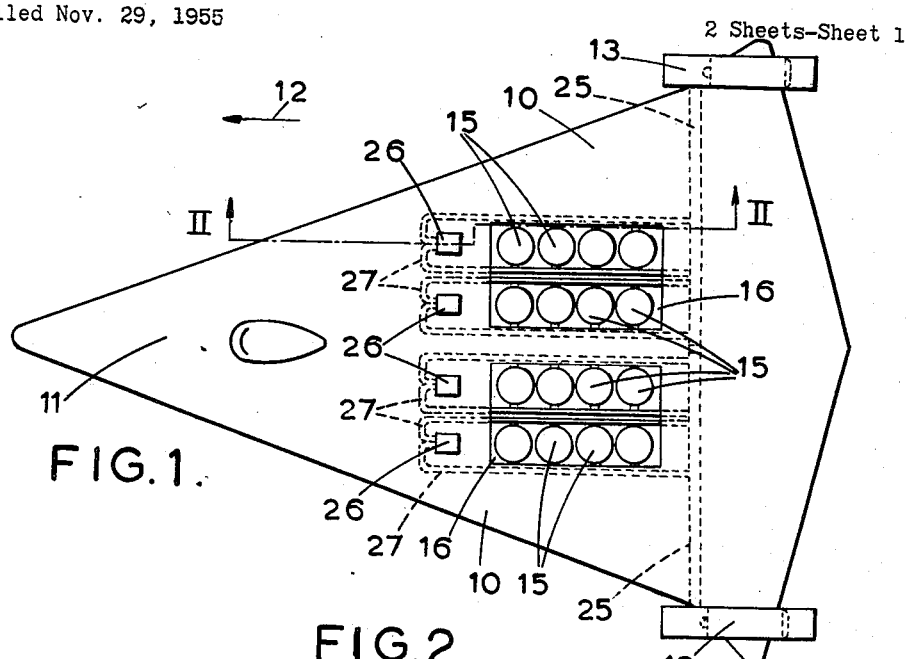
Figure 1 shows a plan view of an aircraft of the Delta type having forward flight propulsion engines and additionally lift engines.

Referring to Figure 1 it will be seen that the aircraft comprises a structure of Delta form in which lift-producing aerofoils 10 merge into a body or fuselage 11. The aircraft is designed to be propelled in forward flight in the direction indicated by the arrow 12 by gas-turbine engines in a nacelle structure 13 arranged externally of each aerofoil surface 10 at its lateral extremity. Thus under forward flight conditions lift is produced aerodynamically by the aerofoil and fuslage structure.

In addition independent lift engines 15 are provided in engine bays 16. These engines are also of the gas-turbine jet reaction type, providing a jet reaction in the upward direction. The mode of operation of such an aircraft is described in the co-pending application mentioned above.

Figure 2:
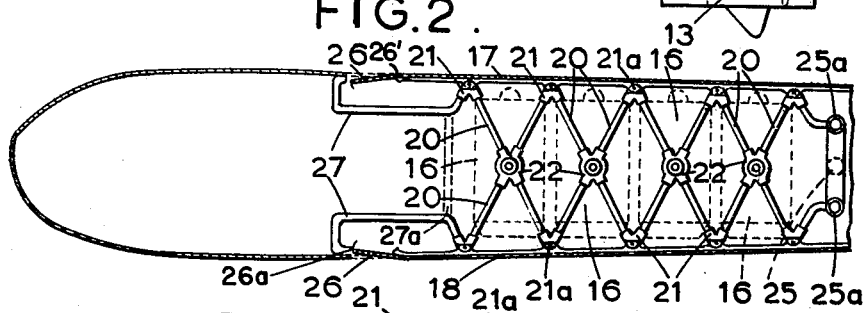
Figure 2 is a diagrammatic cross-section on the line 11—11 of Figure 1 but shown on a larger scale.

The present invention is applied in such an aircraft for the purpose of heating internal structural members extending between the upper and lower skin surfaces 17 and 18 of the aerofoils 10, these structural members not only bracing the aerofoil structure but additionally providing support for the lift engines shown in dotted lines in Figure 2.

Figure 3:
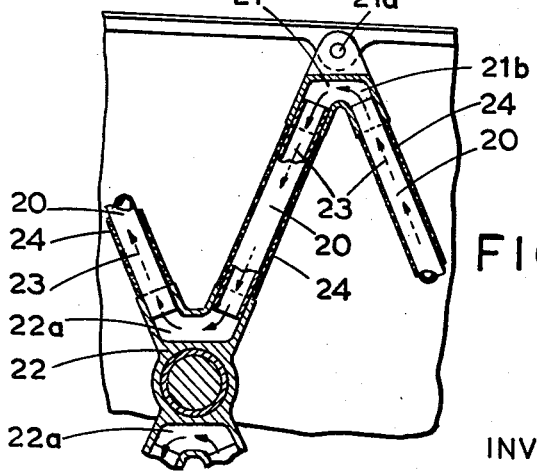
Figure 3 is a diagrammatic detail view showing internal structural members of hollow tubular form.

As will be more clearly seen in Figures 2 and 3 the internal structure comprises tubular members 20 connected to end fittings 21. The end fittings 21 connect by pin fixings 21a with the upper and lower skin surfaces 17 and 18, whilst at their inner ends the members 20 engage engine trunnion mounting fittings 22. It will be noted that the fittings 21 and 22 have internal passage formations 21b and 22a. Thus air can be caused to flow through the tubular internal structure as indicated by arrows 23 in Figure 3. The tubular members 20 are preferably lagged externally by a small thickness of thermal insulating material as indicated at 24. Air is passed through the hollow internal structure thus provided, being tapped by ducting 25 leading from the air intakes of the nacelles 13. Such ducting branches to the two conduits 25a shown in Figure 2.

Figure 4:
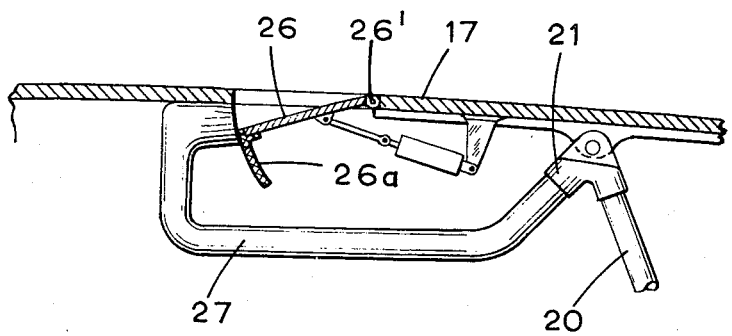
Figure 4 is a fragmentary longitudinal sectional view, on an enlarged scale, through one of the air discharge nozzles.

The airflow through the tubular structure is controlled by means of pivoted flaps 26, best seen in Figure 4, hinged to the aircraft skin which when swung about their hinges 26¹ inwardly into the aircraft structure permit the air to exhaust rearwardly to atmosphere. When the flaps 26 are swung outwardly to conform with the contour of the skin surfaces 17 and 18 flanges 26a act as valve members closing off the exhaust ducting 27 leading from the tubular members 20.

Whilst the aircraft is accelerating or decelerating the flaps 26 will be in a position permitting the flow of air through the structural members 20, whereby the internal structure assumes with rapidity the equilbrium temperature corresponding to the forward flight speed. When the aircraft is flying at a steady speed the flaps 26 can close off the exhaust ducts 27 restricting the airflow through the structural members 20, thereby reducing drag on the aircraft.

If desired in an arrangement as shown in Figure 2 one of the connections 25a may provide an inlet to the tubular internal structural members, whilst the second connection 25a may lead to a rearwardly-facing nozzle, the ducts 27 being interconnected in such an arrangement as for example by a pipe shown in dotted lines at 27A whereby the air flows forwardly through one set of structural members and then rearwardly through the other set.

Whilst the invention has been described as being applicable to structural members supporting lift engines, it will be appreciated that it may also be applied to other internal structural members supporting or connected to an external skin or shell.

What I claim is:

1. A supersonic speed aircraft compising in combination, an outer shell exposed to the circumambient atmosphere and subject to heating by passage therethrough, a load within the shell, hollow load-supporting members within the shell attached to said load and at each end to spaced positions on the outer shell to support the load from the shell, means to supply heating air to within said hollow supporting members to heat them to a temperature commensurate with that of the shell, means to exhaust said heating air from said hollow supporting members, apertures in said outer shell connected to said means to supply heating air to said hollow members whereby said heating air is ambient air heated solely by supersonic flight of the aircraft.

2. An aircraft designed for flight at supersonic speeds having a shell with at least upper and lower surfaces exposed to the circumambient atmosphere and subject to heating by passage therethrough, internal hollow tubular structural members each extending generally vertically between and attached at its outer ends respectively to the upper and to the lower shell surfaces and elsewhere to loads supported thereby from the shell, means to supply heated air to the hollow interior of said tubular members and an exhaust outlet therefrom whereby a stream of heated air is caused to flow through the said hollow interior of the tubular members to heat them when the said surfaces are heated, and means to heat said air solely by the supersonic flight of the aircraft.

3. An aircraft as claimed in claim 1 having a gas turbine engine and in which the air is led into the hollow interior of the structural members through air intake means which lead out from the air intake of said gas turbine engine at a point at which the said air has become heated by compression due to the flight speed of the aircraft.

4. An aircraft as claimed in claim 1 in which means are provided for controlling the exhaust means from the said hollow interior of said structural members whereby the rate of flow of the stream of air through the said hollow interior can be controlled.

5. An aircraft as claimed in claim 4 in which the outflow from said hollow interior is through holes in said shell, valve members for controlling said outflow and movable into one position in which they close said holes and form a continuous surface with said shell and into another position to open said holes and permit air to exhaust from said hollow interior.

6. An aircraft as claimed in claim 5 said valve members being flap valves, the valve members being moveable about hinges to lie flush with said surface and close said holes and to move inwards to open same, said valve members carrying extensions which close the outlets of said hollow structural members when moved to close said holes in said skin.

7. An aircraft as claimed in claim 1 in which there are mounted inside said shell and comprising said load therefor a plurality of jet engines normally discharging downwards so as to exercise a lifting force on the aircraft, said internal structure comprising a series of X shaped members extending between the upper and lower surfaces of the shell, the ends of the arms of each X being respectively joined to the said upper and lower surfaces and the arms of adjacent X's and the centre of the X's supporting trunnions in turn supporting said lift engines, the arms of said X members above and below said trunnions being hollow so that two continuous air passage ways are formed through the said members one above and the other below the line of said trunnions.

8. An aircraft as claimed in claim 7 in which said two passage ways are joined so as to form one continuous passageway at one end of which said heated air is introduced and from the other of which it is exhausted.

9. An aircraft as claimed in claim 1 in which the hollow, load-supporting members have good thermal conductivity, and a thin layer of heat insulating material surrounding each such member to provide the same uniform order of heating throughout the load-supporting structure as occurs in the outer shell.

References Cited in the file of this patent

UNITED STATES PATENTS

| | | |
|---|---|---|
| 1,922,371 | Jones | Aug. 15, 1933 |
| 2,477,637 | Mercier | Aug. 2, 1949 |
| 2,488,991 | Stalker | Nov. 22, 1949 |
| 2,568,813 | Lundberg | Sept. 25, 1951 |
| 2,581,760 | Harpoothian et al. | Jan. 8, 1952 |
| 2,701,696 | Felt | Feb. 8, 1955 |
| 2,760,740 | Brass | Aug. 28, 1956 |

FOREIGN PATENTS

| | | |
|---|---|---|
| 183,085 | Great Britain | July 20, 1922 |
| 727,307 | Germany | Oct. 30, 1942 |
| 883,527 | France | Mar. 29, 1943 |